Jan. 15, 1935.  F. J. SCHUMACHER  1,988,091
PACKAGING
Filed Nov. 4, 1931
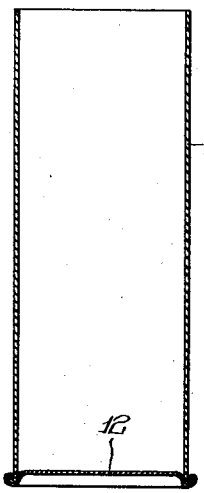
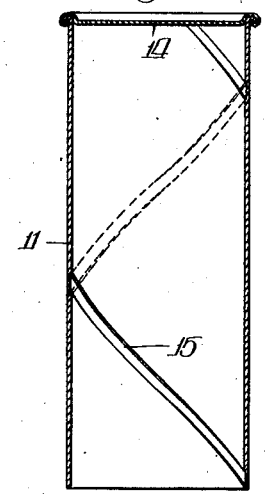
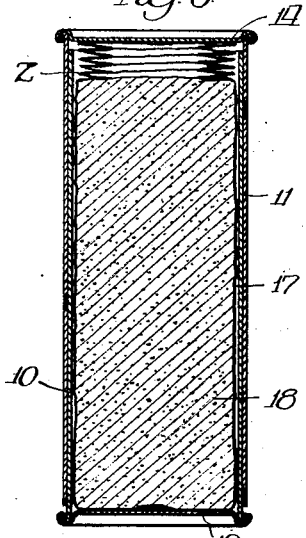
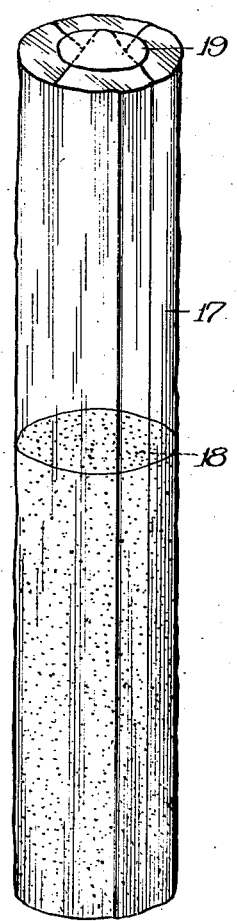
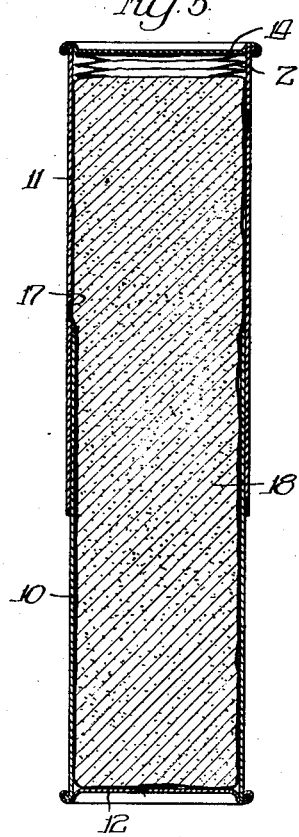
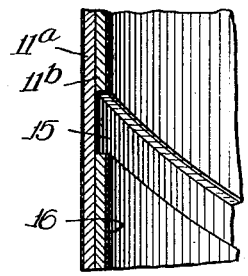
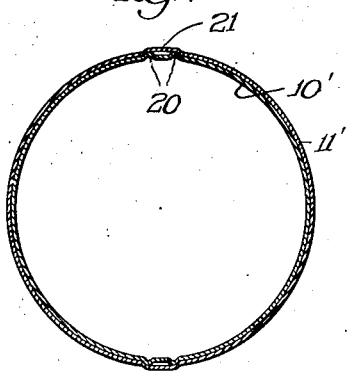
Inventor:
Frank J. Schumacher,
By Cromwell, Greist & Warden
attys Patented Jan. 15, 1935

1,988,091

UNITED STATES PATENT OFFICE 1,988,091

PACKAGING

Frank J. Schumacher, Chicago, Ill., assignor to General Outdoor Advertising Co., Inc., Chicago, Ill., a corporation of New Jersey Application November 4, 1931, Serial No. 572,894

2 Claims. (Cl. 99—8)

This invention relates to packaging, and has to do particularly with the packaging of leavened dough for its protection, preservation, distribution and marketing in uncooked condition. The invention includes both the complete package and a novel container adapted to constitute a part of same.

The preparation and use of "ice box dough" is quite well known in domestic cookery. In a practice quite generally employed, it has been customary to prepare the dough in a manner usual in bread making, the yeast being incorporated therein, and to put in refrigeration such portion of the batch as is not desired for immediate baking. Under refrigeration, the growth and biochemical action of the yeast is inhibited or retarded to such an extent that the dough may be kept for a period of several days, and may be drawn upon as desired for the making of batches of rolls or the like from day to day. When taken from refrigeration, the portion desired for use is allowed to rise, under suitable temperature conditions, preliminary to the baking.

One of the objects of the present invention is the provision of a suitable package and container whereby dough, completely prepared with the leavening material therein, may be sold on the market in portions of convenient size and form and in condition for immediate use or for keeping under refrigeration for use from time to time.

When closely confined or sealed and kept under temperature conditions conducive to fermentation, yeast-leavened dough has the capacity of engendering extremely high pressures upon the confining container, such pressures being produced by the biochemical action of the yeast.

One of the objects of the present invention is the provision of a package and container whereby dough with the leavening material therein may be effectively protected and preserved in a form convenient for merchandising and household use and whereby the package is safeguarded with respect to the internal pressures which might be developed by action of the yeast and the dough safeguarded against "killing" or the breaking down of the spongy structure which gives the cooked product its desirable lightness.

Another object is the provision of a package and container which may be easily and economically made and filled by the packer and which may be conveniently and advantageously utilized by the consumer in the extraction of such portions of its contents as may be desired for use from time to time and the effective protection and preservation of the remainder.

Other and further objects and advantages of the invention will be pointed out or indicated hereinafter or will be apparent upon an understanding of the invention or its employment in use.

For the purpose of aiding in an explanation of the invention. I show in the accompanying drawing forming a part of this specification, and hereinafter describe, certain forms in which it may be embodied, but it is to be understood that these are presented merely for purpose of illustration, and are not to be accorded any interpretation calculated to limit the appended claims short of the true and most comprehensive scope of the invention in the art.

In said drawing:

Fig. 1 represents a longitudinal section of an inner telescoping container member, the section being taken on the diameter;

Fig. 2 represents a similar longitudinal section of an outer container member;

Fig. 3 represents a similar section of a completed package in which the container members are shown in telescoped relationship;

Fig. 4 represents a perspective view of a charge with its wrapper;

Fig. 5 represents a package in which the charge has expanded from its original volume;

Fig. 6 is a fragmentary detail on an enlarged scale showing a section of the outer telescoping member; and Fig. 7 is a cross-sectional view of a modified form of container.

The nature of the invention will be most quickly ascertained by consideration of the examples of its embodiments shown in the drawing. The container comprises tubular members 10 and 11, each closed at one end by a head or cap, designated 12 and 14 respectively, said heads or caps being permanently connected and sealed to their respective tubular members. The tubular member 10 may be designated the inner body member and the tubular member 11 the outer body member. They are of approximately equal extent longitudinally, and their diameters are such that they will telescope with a close sliding fit. The body members may be made of a suitably dense and sufficiently rigid cardboard or paper board wound spirally in one or more plies, and the outer body member may be somewhat heavier than the inner body member. The outer body member, in the embodiment illustrated in Figs. 2, 3, 5 and 6, is formed with an internal groove from end to end, said groove being designated by the reference numeral 15, and shown in Fig. 2 as of spiral form. In Fig. 6 is shown a sectional fragment on an enlarged scale of a two-ply construction for the outer body member, the reference numeral 11ª designating the outer ply and the reference numeral 11ᵇ designating the inner ply. The outer side of the inner body member and the inner sides of both body members may be covered with a suitable grease-resisting coating or lining, designated 16.

The package comprises also a flexible charge wrapper 17. This is made of a suitable sheet material, resistant to grease and moisture, such as cellulose sheeting of the type sold under the name "cellophane." It is of generally tubular form and of cross-sectional size such as to be readily insertable, with the charge therein, into the inner body member, but it is of considerably greater length than either of the body members. It may be formed by wrapping a sheet of the material around the charge, which is indicated by the reference numeral 18, in a generally cylindrical form, and uniting the overlapping margins and folding over the end portions and securing them in folded position by a suitable seal 19. The nature of the charge wrapper is such as to provide a flexible, sanitary, protective covering for the charge.

As originally packaged, the longitudinal dimension of the charge is somewhat less than the minimum length of the container, and when the wrapped charge has been inserted in the inner body member, the unfilled portion of the charge wrapper is collapsed longitudinally, in a bellows-like fashion, as indicated at Z in Fig. 3, whereupon the outer body member is telescoped onto the inner body member and pressed down to the limit of movement.

As stated above, the relative diameters of the body members are such that they will have a frictional sliding fit, this for the purpose of retaining them in their telescoped relationship incident to the handling of the package contemplated in transportation and marketing. The telescoping movement of the body members, as well as their subsequent separation when the package is opened, are rendered possible by the provision of the venting passage opening at one end within the container and at the other end externally of the container, such venting passage permitting a restricted flow of air from within the container as the telescoping members are slid together and a restricted flow of air into the container as they are slid apart. The fit of the body members should be such that the weight of the charge is insufficient to draw them apart, so that such operation can be accomplished only by the application of additional force.

The package as thus prepared is ready for marketing, the telescoping members being left free for relative sliding movement, so that they will accommodate expansion of the charge. Yeast-leavened dough of ordinary formula will expand to double its original bulk under suitable temperature conditions. The rate of expansion under temperatures of 40° F. is relatively slight as compared to the rate under higher temperatures, and while it is contemplated that packages of dough will be kept under refrigeration, allowance must be made for maximum expansion which may occur under the contingencies of marketing and household handling. Consequently, it is desirable that the body members be of approximately equal length. As indicated above, expansion of the charge is accommodated by the relative sliding movement of the inner and outer members of the container. Expansion of the charge is also accommodated by the excess length of the charge wrapper, which will unfold longitudinally as the charge expands, and which will also accommodate some expansion in girth by virtue of the loose fit of the wrapper in the container. Fig. 3 illustrates a package in which expansion of the charge has taken place.

In the hands of the consumer, the package is readily opened by withdrawing the inner member from the outer member and opening the charge wrapper at the exposed end. The desired portion of the charge may then be extracted from the wrapper, the exposed end of the wrapper then refolded into the inner body member, and the outer body member then replaced on the latter. Thus the remainder of the charge is retained in a fully protected condition.

The charge wrapper, with its content comprising all or a remaining part of the charge, may be withdrawn from and readily replaced in the open container.

In Fig. 7 is illustrated a cross-sectional view of an alternative construction of a container such as may be formed of light sheet metal of the sort generally employed in tin cans. In the construction here illustrated, the inner body member is designated by the reference numeral 10' and the outer body member by the reference numeral 11', said body members being arranged for a close telescoping fit. To provide for the venting groove, the inner body member is formed with a pair of spaced outwardly struck beads or corrugations 20 which extend in parallel relationship from end to end of said body member and project slightly, as for a distance approximately the thickness of the metal, from the general circular periphery. The outer body member is provided with an outwardly struck portion 21, affording an internal groove, of a width approximately equal to the distance between the outer sides of the members 20 and of a depth approximately equal to the height of said members. Such an arrangement is preferably provided at opposite locations on the container so as to act as guides for the comparatively flexible body members and hold them for straight line movement in the telescoping operations, in order to prevent cramping. The space between the associated members 20 within the out-struck channel 21 affords the restricted venting channel which opens at one end inside the container and at the other end externally thereof. In the use of this form of construction it may be desirable to apply a lubricating film to the outer surface of the inner body member to facilitate the telescoping movement.

In addition to affording the desired protection for the charge, the charge wrapper prevents the closing of the venting channel upon expansion of the charge and also prevents the body members becoming stuck by adhesion of the charge to them. The end caps or covers may be formed conveniently of sheet metal crimped or seamed to the ends of the tubular body members, and by making the latter of cardboard, the warming of the charge, after the package has been refrigerated, is very substantially slowed, because of the heat insulating characteristic of that material.

What I claim is:

1. A merchandising package for dough and similar expansible material comprising, in combination, a pair of container members each having a tubular body portion closed at one end and adapted for telescoping assembly one within the other with a close sliding fit to form a closed container, said body portions being formed to afford a venting channel extending longitudinally thereof and opening at one end within the container and at the other end externally thereof, and a flexible charge wrapper of substantially greater length than either of the body portions and arranged to envelop the charge within the container, said charge wrapper having a portion unoccupied by the charge and collapsed within the container at one end thereof and adapted to accommodate expansion of the charge.

2. A merchantable package of dough comprising, in combination, a pair of container members each closed at one end and having tubular body portions movable telescopically one within the other with a close sliding fit to form a closed container and affording a venting channel extending longitudinally of said container and opening at one end within the same and at the other end externally thereof, and a charge of expansible dough enveloped with a charge wrapper of flexible sheet material housed in the container, said charge wrapper having an unoccupied end portion collapsed within the container at one end thereof and adapted to accommodate and envelop a portion of the charge upon expansion of the latter, the container members being adapted to accommodate expansion of the charge by longitudinally sliding movement of one relative to the other.

FRANK J. SCHUMACHER.